US012767777B2

(12) United States Patent
Gao et al.

(10) Patent No.: US 12,767,777 B2
(45) Date of Patent: Oct. 20, 2026

(54) RECYCLING METHOD OF WASTE POLYSTYRENE

(71) Applicant: Jilin University, Changchun City (CN)

(72) Inventors: Yan Gao, Changchun City (CN); Jialin Guo, Changchun City (CN); Xuejun Cui, Changchun City (CN)

(73) Assignee: Jilin University, Changchun City (CN)

( * ) Notice: Subject to any disclaimer, the term of this patent is extended or adjusted under 35 U.S.C. 154(b) by 584 days.

(21) Appl. No.: 18/242,997

(22) Filed: Sep. 6, 2023

(65) Prior Publication Data

US 2024/0084092 A1 Mar. 14, 2024

(30) Foreign Application Priority Data

Sep. 8, 2022 (CN) ......................... 202211094771.2

(51) Int. Cl.
*C08J 11/06* (2006.01)

(52) U.S. Cl.
CPC ............ *C08J 11/06* (2013.01); *C08J 2325/06* (2013.01)

(58) Field of Classification Search
USPC ............................................................ 521/47
See application file for complete search history.

(56) References Cited

U.S. PATENT DOCUMENTS 5,596,045 A 1/1997 Scherzer et al.

FOREIGN PATENT DOCUMENTS

| | | | | | |
|---|---|---|---|---|---|
| CN | 101701073 | A | | 5/2010 | |
| CN | 112940404 | A | * | 6/2021 | .............. C08J 9/009 |
| JP | 2001335514 | A | | 12/2001 | |
| JP | 2005154525 | A | * | 6/2005 | ............. B29B 17/02 |
| KR | 20060030155 | A | | 4/2006 | |
| KR | 20070053953 | A | | 5/2007 | |
| WO | 2006030020 | A1 | | 3/2006 | |

OTHER PUBLICATIONS

CN-112940404-A Machine Translation (Year: 2021).*
JP-2005154525-A Machine Translation (Year: 2005).*
Chinese Office Action for Application No. 202211094771.2 dated Aug. 4, 2023.

* cited by examiner

*Primary Examiner* — Terressa Boykin
(74) *Attorney, Agent, or Firm* — Patterson + Sheridan, LLP

(57) ABSTRACT

Provided is a recycling method of waste polystyrene. In the recycling method, the waste polystyrene is subjected to first swelling and dissolving in water at 140° C. to 300° C. The waste polystyrene may swell and depolymerize in water at 140° C. to 300° C.; meanwhile, the waste polystyrene could self stretch and depolymerize chain segments thereof at 140° C. to 300° C. Under the dual depolymerization mechanism, the polystyrene is remodeled.

11 Claims, No Drawings

RECYCLING METHOD OF WASTE POLYSTYRENE

CROSS-REFERENCE TO RELATED APPLICATION

This patent application claims the benefit and priority of Chinese Patent Application No. 202211094771.2 filed with the China National Intellectual Property Administration on Sep. 8, 2022, the disclosure of which is incorporated by reference herein in its entirety as part of the present application.

TECHNICAL FIELD

The present disclosure relates to the technical field of plastic recycling, in particular to a recycling method of waste polystyrene.

BACKGROUND

With the rapid development of construction and industry, a large amount of waste polystyrene (PS) is produced globally every year. However, most of the waste PS has been buried or incinerated, resulting in a serious waste of resources and environmental pollution.

Recycling is the most important measure of environmental hazard-free treatment, also known as resource regeneration technology. Currently, the main way to reuse waste polystyrene is to prepare expandable polystyrene particles with the waste polystyrene. The expandable polystyrene particles are prepared with the waste polystyrene by an organic solvent method.

Chinese application CN112940404A discloses a method for remolding polystyrene plastic particles, including the following steps: removing dirts from a pre-remodeled polystyrene foam, dissolving the foam in an organic solvent, heating the obtained mixture in warm water containing sodium dodecyl benzene sulfonate (SDBS), and subjecting the heated mixture to solid-liquid separation to obtain polystyrene particles; soaking the polystyrene particles into a foaming agent to obtain expandable polystyrene particles; coating the expandable polystyrene particles with a slurry obtained by mixing a flame retardant, hydrophobic silica, and an inorganic coating material, and subjecting the coated expandable polystyrene particles to aging to obtain flame-retardant particles; and finally treating the flame-retardant particles with a mixed solvent and modified graphene to obtain the polystyrene plastic particles. Chinese application CN101701073A discloses a method for functional remodeling of waste polystyrene, including: pretreating a polystyrene foam and dissolving in a water-insoluble organic solvent to obtain a polystyrene swelling body; adding the polystyrene swelling body into water containing a surfactant, and subjecting the obtained mixture to continuous stirring, heating distillation, and solid-liquid separation to obtain finished polystyrene particles; and soaking the finished polystyrene particles into a foaming agent to obtain expandable polystyrene (EPS) particles. It can be seen that the organic solvent method is to dissolve the plastic foam using a suitable organic solvent and then regenerating by granulation. If suitable organic solvents are used, it is possible to remodel waste PS plastic foam without the degradation of polymeric chains. However, the currently used organic solvents are mainly benzene or benzene derivatives, esters, or halogenated hydrocarbon solvents. Most of these organic solvents have strong toxicity, high cost, strong odor, and low recovery efficiency, thus limiting the application thereof.

SUMMARY

In view of the above problems, an object of the present disclosure is to provide a recycling method of waste polystyrene. The recycling method according to the present disclosure does not use organic solvents, which avoids problems of toxicity, peculiar smell, and high cost in the organic solvent method.

To achieve the above object, the present disclosure provides the following technical solutions.

The present disclosure provides a recycling method of waste polystyrene, including the following steps: subjecting waste polystyrene and water to first swelling and dissolving to obtain a polystyrene solution; subjecting the polystyrene solution and a first surfactant to first mixing to obtain a first mixed material; and subjecting the first mixed material to first cooling and first centrifugation in sequence to obtain a recycled polystyrene; wherein a mass ratio of the waste polystyrene to water is less than or equal to 1:1; and the first swelling and dissolving is conducted at a temperature of 140° C. to 300° C.

In some embodiments, the first mixing is conducted at a temperature of 140° C. to 300° C.

In some embodiments, the first surfactant includes one or more selected from the group consisting of polyvinylpyrrolidone (PVP), sodium fatty alcohol polyoxyethylene ether sulfate (AES), a stearate, sodium palmitate, an oleate, an alkyl cellulose, cetyltrimethylammonium bromide (CTAB), gelatin, sodium dodecyl benzene sulfonate (SDBS), sodium dodecyl sulfate (SDS), sodium polyacrylate, and a disproportionated rosinate; the stearate includes potassium stearate and/or sodium stearate; the oleate includes potassium oleate and/or sodium oleate; the alkyl cellulose includes one or more selected from the group consisting of hydroxypropyl cellulose (HPC), methylcellulose (MC), methyl hydroxyethyl cellulose (MHEC), and hydroxyethyl cellulose (HEC); and the disproportionated rosinate includes disproportionated potassium rosinate and/or disproportionated sodium rosinate.

In some embodiments, a mass of the first surfactant is 1% to 8% of a mass of water.

In some embodiments, the first mixed material further includes a first functional auxiliary agent and/or a first foaming system, wherein the first functional auxiliary agent includes a first flame retardant and/or a first heat insulating agent; the first flame retardant includes hexabromocyclododecane (HBCD) and/or methyl octabromoether (MOBE); the first heat insulating agent includes graphite and/or graphene; the first foaming system includes a first foaming agent and a first inorganic dispersant; the first foaming agent is a physical foaming agent including one or more selected from the group consisting of an alkane, petroleum ether, carbon dioxide, and Freon; the alkane includes one or more selected from the group consisting of propane, butane, pentane, hexane, and heptane; the Freon includes Freon 11 and/or Freon 12; and the first inorganic dispersant includes one or more selected from the group consisting of calcium phosphate, hydroxy calcium phosphate, calcium carbonate, calcium oxalate, barium sulfate, calcium sulfate, zinc oxide, magnesium hydroxide, aluminum hydroxide, bentonite, kaolin, titanium dioxide, graphite, and mica.

In some embodiments, masses of the first flame retardant and the first heat insulating agent each are independently 0.1% to 8% of a mass of the waste polystyrene.

In some embodiments, a mass of the first foaming agent is 6% to 10% of a mass of the waste polystyrene; and a mass of the inorganic dispersant is 0.1% to 9% of a mass of water.

In some embodiments, the recycling method further includes the following steps after the first centrifugation: subjecting intermediate particles obtained after the first centrifugation, a second surfactant aqueous solution, and a second foaming system to second mixing to obtain a second mixed material, and then subjecting the second mixed material to second swelling and dissolving, second cooling, and second centrifugation in sequence.

In some embodiments, the first mixed material further includes a second functional auxiliary agent; the second functional auxiliary agent includes a second flame retardant and/or a second heat insulating agent; wherein the second flame retardant includes HBCD and/or MOBE; the second heat insulating agent includes graphite and/or graphene; masses of the second flame retardant and the second heat insulating agent each are independently 0.1% to 8% of a mass of the waste polystyrene.

In some embodiments, the second surfactant aqueous solution has a mass concentration of 4% to 8%; a mass ratio of the intermediate particles to the second surfactant aqueous solution is less than or equal to 1:1; the second foaming system includes a second foaming agent or a foaming agent-inorganic dispersant; a mass of the second foaming agent is 6% to 10% of a mass of the intermediate particles; and a mass of a second inorganic dispersant contained in the foaming agent-inorganic dispersant is 0.1% to 9% of a mass of the second surfactant aqueous solution.

The present disclosure provides a recycling method of waste polystyrene, including the following steps: subjecting waste polystyrene and water to first swelling and dissolving to obtain a polystyrene solution; subjecting the polystyrene solution and a first surfactant to first mixing to obtain a first mixed material; and subjecting the first mixed material to first cooling and first centrifugation in sequence to obtain a recycled polystyrene, wherein a mass ratio of the waste polystyrene to water is less than or equal to 1:1; and the first swelling and dissolving is conducted at a temperature of 140° C. to 300° C. In the recycling method of the present disclosure, the waste polystyrene is subjected to the first swelling and dissolving in water at 140° C. to 300° C. The waste polystyrene may swell and depolymerize in water at 140° C. to 300° C.; meanwhile, the waste polystyrene could self stretch and depolymerize chain segments thereof at 140° C. to 300° C. Under the dual depolymerization mechanism, the polystyrene is remodeled. Since no organic solvent is used, the recycling method does not involve recovery of the organic solvent, showing a shorter operation time and a higher efficiency; and the recycled polystyrene particles have no organic solvent residue, resulting in a better product quality. In addition, without the organic solvent, problems of toxicity, odor, and a high cost during the recycling could be avoided.

DETAILED DESCRIPTION OF THE EMBODIMENTS

The present disclosure provides a recycling method of waste polystyrene, including the following steps: subjecting waste polystyrene and water to first swelling and dissolving to obtain a polystyrene solution; subjecting the polystyrene solution and a first surfactant to first mixing to obtain a first mixed material; and subjecting the first mixed material to first cooling and first centrifugation in sequence to obtain a recycled polystyrene; wherein a mass ratio of the waste polystyrene to water is less than or equal to 1:1; and the first swelling and dissolving is conducted at a temperature of 140° C. to 300° C.

In the present disclosure, the raw materials provided herein are all preferably commercially-available products unless otherwise specified.

In the present disclosure, waste polystyrene and water are subjected to first swelling and dissolving to obtain a polystyrene solution. In some embodiments, the waste polystyrene includes waste polystyrene foam and/or waste polystyrene particles. In some embodiments, the waste polystyrene is subjected to pretreatment before the first swelling and dissolving with water; and the pretreatment includes decontamination and fragmentation. In some embodiments, under the condition that the waste polystyrene is the waste polystyrene foam, the waste polystyrene foam is subjected to the first swelling and dissolving with water in batches.

In the present disclosure, a mass ratio of the waste polystyrene to water is less than or equal to 1:1, preferably 1:1 to 1:10.

In the present disclosure, the first swelling and dissolving is conducted at a temperature of 140° C. to 300° C., preferably 150° C. to 250° C. In some embodiments, the temperature of the first swelling and dissolving is obtained by heating at a rate of 0.5° C./min to 1° C./min; and the first swelling and dissolving is conducted under stirring at 50 rpm to 300 rpm. There is no special limitation on the time for the first swelling and dissolving, as long as the waste polystyrene could be completely swelled and dissolved.

In the present disclosure, after obtaining the polystyrene solution, the polystyrene solution and a first surfactant is subjected to first mixing to obtain a first mixed material. In some embodiments, the first surfactant includes one or more selected from the group consisting of PVP, AES, a stearate, sodium palmitate, an oleate, an alkyl cellulose, CTAB, gelatin, SDBS, SDS, sodium polyacrylate, and a disproportionated rosinate. In some embodiments, the stearate includes potassium stearate and/or sodium stearate. In some embodiments, the oleate includes potassium oleate and/or sodium oleate. In some embodiments, the alkyl cellulose includes one or more selected from the group consisting of HPC, MC, MHEC, and HEC. In some embodiments, the disproportionated rosinate includes disproportionated potassium rosinate and/or disproportionated sodium rosinate. In some embodiments, a mass of the first surfactant is 1% to 8% of a mass of water.

In some embodiments, the first mixed material further includes a first functional auxiliary agent and/or a first foaming system. In some embodiments, the first functional auxiliary agent includes a first flame retardant and/or a first heat insulating agent. In some embodiments, the first flame retardant includes HBCD and/or MOBE. In some embodiments, the first heat insulating agent includes graphite and/or graphene. In some embodiments, masses of the first flame retardant and the first heat insulating agent each are independently 0.1% to 8% of a mass of the waste polystyrene.

In some embodiments, the first foaming system includes a first foaming agent and a first inorganic dispersant. In some embodiments, the first foaming agent is a physical foaming agent including one or more selected from the group consisting of an alkane, petroleum ether, carbon dioxide, and Freon. In some embodiments, the alkane includes one or more selected from the group consisting of propane, butane, pentane, hexane, and heptane. In some embodiments, the Freon includes Freon 11 and/or Freon 12. In some embodiments, a mass of the first foaming agent is 6% to 10% of the mass of the waste polystyrene. In some embodiments, the first inorganic dispersant includes one or more selected from the group consisting of calcium phosphate, hydroxy calcium phosphate, calcium carbonate, calcium oxalate, barium sulfate, calcium sulfate, zinc oxide, magnesium hydroxide, aluminum hydroxide, bentonite, kaolin, titanium dioxide, graphite, and mica. In some embodiments, the mica is water-insoluble mica. In some embodiments, a mass of the first inorganic dispersant is 0.1% to 9% of the mass of water.

In some embodiments, the first mixing is conducted at a temperature of 140° C. to 300° C., preferably 150° C. to 250° C.; the first mixing is conducted for 0.5 h to 1 h. In some embodiments, the first mixing is conducted under stirring at 50 rpm to 300 rpm.

In some embodiments, the first cooling is conducted to cool the first mixed material to ambient temperature. In some embodiments, the first centrifugation is conducted in a centrifuge.

In some embodiments, the recycling method further includes the following steps after the first centrifugation: subjecting intermediate particles obtained after the first centrifugation, a second surfactant aqueous solution, and a second foaming system to second mixing to obtain a second mixed material, and then subjecting the second mixed material to second swelling and dissolving, second cooling, and second centrifugation in sequence. That is, the present disclosure further provides another recycling method of waste polystyrene, including the following steps: subjecting waste polystyrene and water to first swelling and dissolving to obtain a polystyrene solution; subjecting the polystyrene solution and a first surfactant to first mixing to obtain a first mixed material; and subjecting the first mixed material to first cooling and first centrifugation in sequence to obtain intermediate particles; and subjecting the intermediate particles, a second surfactant aqueous solution, and a second foaming system to second mixing to obtain a second mixed material, and then subjecting the second mixed material to second swelling and dissolving, second cooling, and second centrifugation to obtain the recycled polystyrene; wherein a mass ratio of the waste polystyrene to water is less than or equal to 1:1; and the first swelling and dissolving is conducted at a temperature of 140° C. to 300° C.

In the present disclosure, waste polystyrene and water are subjected to first swelling and dissolving to obtain a polystyrene solution. In some embodiments, the mass ratio of the waste polystyrene to water and the parameters of the first swelling and dissolving are consistent with the technical solution above, and will not be repeatedly described here.

In the present disclosure, after obtaining the polystyrene solution, the polystyrene solution and a first surfactant is subjected to first mixing to obtain a first mixed material. In some embodiments, the type of the first surfactant is consistent with the type of the first surfactant described in the above technical solution, and will not be repeatedly described here. In some embodiments, the mass of the first surfactant is preferably consistent with the added mass of the first surfactant described in the above technical solution, and will not be repeatedly described here.

In some embodiments, the first mixed material further includes a second functional auxiliary agent. In some embodiments, the second functional auxiliary agent includes a second flame retardant and/or a second heat insulating agent. In some embodiments, the second flame retardant includes HBCD and/or MOBE. In some embodiments, the second heat insulating agent includes graphite and/or graphene. In some embodiments, masses of the flame retardant and the heat insulating agent each are independently 0.1% to 8% of the mass of the waste polystyrene.

In the present disclosure, after obtaining the first mixed material, the first mixed material is subjected to first cooling and first centrifugation in sequence to obtain intermediate particles. In some embodiments, the parameters of the first cooling and the first centrifugation are consistent with the parameters of the first cooling and the first centrifugation described in the above technical solution, and will not be repeatedly described here.

In some embodiments, the intermediate particles have a particle size of 0.5 mm to 3 mm.

In the present disclosure, after obtaining the intermediate particles, the intermediate particles, a second surfactant aqueous solution, and a second foaming system are subjected to second mixing to obtain a second mixed material, and then the second mixed material is subjected to second swelling and dissolving, second cooling, and second centrifugation to obtain the recycled polystyrene.

In some embodiments, the second surfactant aqueous solution has a mass concentration of 4% to 8%. In some embodiments, the type of a second surfactant in the second surfactant aqueous solution is the same as that of the first surfactant described in the above technical solution, and will not be repeatedly described here. In some embodiments, a mass ratio of the intermediate particles to the second surfactant aqueous solution is less than or equal to 1:1.

In some embodiments, the second foaming system includes a second foaming agent or a foaming agent-inorganic dispersant. In some embodiments, the types of the second foaming agent and a third foaming agent and a second inorganic dispersant contained in the foaming agent-inorganic dispersant are respectively consistent with the types of the first foaming agent and the first inorganic dispersant described in the above technical solution, and will not be repeatedly described here. In some embodiments, a mass of the second foaming agent is 6% to 10% of a mass of the intermediate particles. In some embodiments, a mass of the third foaming agent contained in the foaming agent-inorganic dispersant is 6% to 10% of the mass of the intermediate particles. In some embodiments, a mass of the second inorganic dispersant contained in the foaming agent-inorganic dispersant is 0.1% to 9% of the mass of the second surfactant aqueous solution.

In some embodiments of the present disclosure, the parameters of the second mixing, the second swelling and dissolving, the second cooling, and the second centrifugation are the same as those of the first mixing, the first swelling and dissolving, the first cooling and the first centrifugation described in the above technical solution, and will not be repeatedly described here.

In some embodiments of the present disclosure, after the second centrifugation, a product is dried, coated, screened, and packaged in sequence.

In some embodiments of the present disclosure, the recycling method of waste polystyrene is conducted in an autoclave provided with at least four feed ports; the autoclave is provided with a liquid feed port 1, a liquid feed port 2, a solid feed port 1, and a solid feed port 2.

The recycling method of waste polystyrene according to the present disclosure are described in detail below in conjunction with examples, but these examples may not be understood as limitation to the protection scope of the present disclosure.

Example 1 a. 50 kg of a pretreated waste polystyrene foam was added into a 5,000 L autoclave through a solid feed port 1 of the autoclave, and the autoclave was sealed.

b. 2,000 kg of water was added into the autoclave through a liquid feed port 1 of the autoclave, and the autoclave was sealed. The waste polystyrene foam was completely dissolved by continuous stirring at 50 rpm and 190° C. in the autoclave to obtain a high-temperature dissolution solution, wherein the temperature inside the autoclave was achieved by heating at a heating rate of 1° C./min. The high-temperature dissolution solution at 190° C. was added into another 5,000 L autoclave filled with 50 kg of the pretreated waste polystyrene foam, and continuously stirred at 50 rpm and a constant temperature of 190° C. for 30 min, thus dissolving the waste polystyrene foam. The above dissolving operation was repeated until 500 kg of the pretreated waste polystyrene foam was completely dissolved in water to obtain a polystyrene solution, wherein a mass ratio of the waste polystyrene foam to water (oil-water ratio) was 1:4.

c. 40 kg of SDS (a mass of SDS was 2% of the mass of water) was added into the autoclave through a solid feed port 2 of the autoclave, the autoclave was sealed, and the obtained mixture was stirred at a constant temperature of 190° C. for 0.75 h to obtain a mixed material.

d. A cooling device of the autoclave was started under stirring the mixed material, and the mixed material was cooled down to ambient temperature.

e. The cooled mixed material was transferred into a centrifuge through a discharge port of the autoclave and separated.

f. The separated mixed material with a certain humidity was dried, cooled, sieved and packaged, obtaining white and semi-translucent recycled polystyrene spherical particles with a particle size of 1.5 mm to 3.0 mm.

Example 2 a. 2,000 kg of waste polystyrene particles were added into a 5,000 L autoclave through a solid feed port 1 of the autoclave, and the autoclave was sealed.

b. 2,000 kg of water was added into the autoclave through a liquid feed port 1 of the autoclave, wherein a mass ratio of the waste polystyrene to water (oil-water ratio) is 1:1, and the autoclave was sealed. The waste polystyrene particles were completely dissolved by continuous stirring at 90 rpm and 220° C. in the autoclave to obtain a polystyrene solution, wherein the temperature inside the autoclave was achieved by heating at a heating rate of 0.5° C./min.

c. 100 kg of SDBS (a mass of SDBS was 5% of a mass of water) was added into the autoclave through a solid feed port 2 of the autoclave, the autoclave was sealed, and the obtained mixture was stirred at a constant temperature of 220° C. for 0.5 h.

d. The mixture was cooled to 90° C. under stirring, and 200 kg of pentane (a mass of pentane was 10% of a mass of the waste polystyrene) was added into the autoclave through a liquid feed port 2 of the autoclave, and stirred at a constant temperature for 4 h to obtain a mixed material, during which, 10 kg of hydroxy calcium phosphate (a mass of the hydroxy calcium phosphate was 5%0 of the mass of water) was added into the autoclave in two batches through a solid feed port 2 of the autoclave, and the feed ports of the autoclave were immediately sealed.

e. A cooling device of the autoclave was started under stirring the mixed material obtained in step d, and the mixed material was cooled down to ambient temperature.

f. The cooled mixed material was transferred into a centrifuge through a discharge port of the autoclave and separated.

g. A separated mixed material with a certain humidity was dried, cooled, sieved and packaged, obtaining white and semi-translucent recycled polystyrene spherical particles with a particle size of 1.0 mm to 1.5 mm.

The recycled polystyrene spherical particles were foamed and molded into plates and tested. The specific data is shown in Table 1.

TABLE 1

Properties of the recycled polystyrene spherical particles obtained in Example 2

| Number | Test items | Unit | Standard requirement | Test results | Qualified or not | Test standard |
|---|---|---|---|---|---|---|
| 1 | Appearance | — | Color: uniform, the flame retardant type shall be mixed with colored particles to show the difference; appearance: smooth surface, no obvious shrinkage deformation and expansion deformation; fusion: good fusion; impurities: no obvious oil stains and impurities. | The color was uniform, the surface was smooth, the fusion was good, and there was no obvious oil stain and impurity. | Yes | — |
| 2 | Dimension deviation | — | — | — | — | — |
| 2.1 | Length | mm | ±5 | −1 | Yes | GB/T 8811-2008 |
| 2.2 | Width | mm | ±5 | −1 | Yes | |
| 2.3 | Thickness | mm | ±3 | −2 | Yes | |
| 3 | Apparent density | $kg/m^3$ | ≥15.0 | 18.7 | Yes | GB/T 6343-2009 |
| 4 | Compressive strength | kPa | ≥60 | 117 | Yes | GB/T 8813-2020 |
| 5 | Thermal conductivity | W/(m · k) | ≤0.041 | 0.036 | Yes | GB/T 10294-2008 |
| 6 | Dimensional stability | — | — | — | — | — |
| 6.1 | Length | % | ≤4 | 0.4 | Yes | GB/T 8811-2008 |
| 6.2 | Width | % | ≤4 | 0.4 | Yes | |

TABLE 1-continued

| Properties of the recycled polystyrene spherical particles obtained in Example 2 | | | | | | |
|---|---|---|---|---|---|---|
| Number | Test items | Unit | Standard requirement | Test results | Qualified or not | Test standard |
| 6.3 | Thickness | % | ≤4 | 0.8 | Yes | |
| 7 | Bending load at break | N | ≥15 | 17 | Yes | GB/T 8812.1-2007 |

Example 3 a. 50 kg of a pretreated waste polystyrene foam was added into a 5,000 L autoclave through a solid feed port 1 of the autoclave, and the autoclave was sealed.

b. 2,000 kg of water was added into the autoclave through a liquid feed port 1 of the autoclave, and the autoclave was sealed. The waste polystyrene foam was completely dissolved by continuous stirring at 100 rpm and 200° C. in the autoclave to obtain a high-temperature dissolution solution, wherein the temperature inside the autoclave was achieved by heating at a heating rate of 0.8° C./min. The high-temperature dissolution solution at 200° C. was added into another 5,000 L autoclave filled with 50 kg of the pretreated waste polystyrene foam, and continuous stirred at 100 rpm and a constant temperature of 200° C. in the autoclave for 30 min, thus dissolving the waste polystyrene foam. The above dissolving operation was repeated until 1,000 kg of the pretreated waste polystyrene foam was completely dissolved in water to obtain a polystyrene solution, wherein a mass ratio of the waste polystyrene foam to water (oil-water ratio) was 1:2.

c. 80 kg of SDBS (a mass of SDBS was 4% of a mass of water), 8 kg of MOBE (a mass of MOBE was 8%0 of a mass of the waste polystyrene), and 50 kg of a graphite powder (a mass of the graphite powder was 5% of the mass of the waste polystyrene) were added into the autoclave through a solid feed port 2 of the autoclave to obtain a mixture, the autoclave was sealed, and the mixture was stirred at a constant temperature of 200° C. for 1 h.

d. The mixture was cooled to 85° C. under stirring, and 90 kg of petroleum ether (a mass of the petroleum ether was 9% of the mass of the waste polystyrene) was added into the autoclave through a liquid feed port 2 of the autoclave, and stirred at a constant temperature for 5 h to obtain a mixed material, during which, 8 kg of hydroxy calcium phosphate (a mass of hydroxy calcium phosphate was 4%0 of the mass of water) was added into the autoclave in two batches through a solid feed port 2 of the autoclave, and the feed ports of the autoclave were immediately sealed.

e. A cooling device of the autoclave was started under stirring the mixed material, and the mixed material was cooled down to ambient temperature.

f. The cooled mixed material was transferred into a centrifuge through a discharge port of the autoclave and separated.

g. The separated mixed material with a certain humidity was dried, cooled, sieved and packaged, obtaining black, B1-grade, and flame-retardant recycled graphite-polystyrene spherical particles with a particle size of 0.8 mm to 1.8 mm.

The black, B1-grade, and flame-retardant recycled graphite-polystyrene spherical particles were foamed and molded into plates, and then qualified according to the standards of DB22/T 5011-2018 and GB/T 8624-2012, and the specific data is shown in Table 2.

TABLE 2

| Properties of the black, B1-grade, and flame-retardant recycled graphite-polystyrene spherical particles obtained in Example 3 | | | | | | | | |
|---|---|---|---|---|---|---|---|---|
| Number | Test items | | | Unit | Standard requirement | Test Results | Qualified or not | Test standard |
| 1 | Apparent density | | | kg/m$^3$ | 18-22 | 20.6 | Yes | GB/T 6343-2009 |
| 2 | Thermal conductivity | | | W/(m · k) | ≤0.033 | 0.030 | Yes | GB/T 10294-2008 |
| 3 | Compressive strength | | | kPa | ≥90 | 117 | Yes | GB/T 8813-2008 |
| 4 | Perpendicular tensile strength | | | MPa | ≥0.10 | 0.15 | Yes | GB/T 29906-2013 |
| 5 | Combustion performance | Oxygen index | | % | ≥32 | 32.4 | Yes | GB/T 2406.2-2009 |
| | | Combustion level $B_1$ | Single combustion test | W/s | Burning growth rate index $FIGRA_{0.2\ MJ} \leq 120$ | 72.8 | Yes | GB/T 20284-2006 |
| | | | | / | The lateral spread of flame does not reach an edge of a long wing of the sample | The lateral spread of flame did not reach an edge of a long wing of the sample | Yes | |
| | | | | MJ | Total heat release at 600 seconds $THR_{600\ s} \leq 7.5$ | 4.3 | Yes | |
| | | | Flammability test | mm | Flame tip height ≤ 150 within 60 seconds | Flame tip height (Fs) < 150 within 60 seconds | Yes | GB/T 8626-2007, ignition time 30 seconds |
| | | | | / | Within 60 seconds, there is no burning dripping to ignite a filter paper | Within 60 seconds, there was no burning dripping to ignite a filter paper | Yes | |

TABLE 2-continued

Properties of the black, B1-grade, and flame-retardant recycled graphite-polystyrene spherical particles obtained in Example 3

| Number | Test items | | Unit | Standard requirement | Test Results | Qualified or not | Test standard |
|---|---|---|---|---|---|---|---|
| 6 | Water absorption | | % | ≤3 | 1.4 | Yes | GB/T 8810-2005 |
| 7 | Bending deformation | | mm | ≥20 | 23 | Yes | GB/T 8812.1-2007 |
| 8 | Dimensional stability | Length | % | ≤0.3 | 0.20 | Yes | GB/T 8811-2008 |
| | | Width | | | 0.20 | Yes | |
| | | Thickness | | | 0.13 | Yes | |

Example 4 a. 50 kg of a pretreated waste polystyrene foam was added into a 5,000 L autoclave through a solid feed port 1 of the autoclave, and the autoclave was sealed.
b. 2,500 kg of water was added into the autoclave through a liquid feed port 1 of the autoclave, and the autoclave was sealed. The waste polystyrene foam was completely dissolved by continuous stirring at 70 rpm and 240° C. in the autoclave, wherein the temperature inside the autoclave was achieved by heating at a heating rate of 0.5° C./min to obtain a high-temperature dissolution solution. The high-temperature dissolution solution at 240° C. was added into another 5,000 L autoclave filled with 50 kg of the pretreated waste polystyrene foam, and continuously stirred at 70 rpm and a constant temperature of 240° C. in the autoclave for 30 min, thus dissolving the waste polystyrene foam. The above dissolving operation was repeated until 250 kg of the pretreated waste polystyrene foam was completely dissolved in water to obtain a polystyrene solution, wherein a mass ratio of the waste polystyrene foam to water (oil-water ratio) was 1:10.
c. 75 kg of AES (a mass of AES was 3% of a mass of water) and 1.25 kg of HBCD (a mass of HBCD was 5%0 of a mass of waste polystyrene) were added into the autoclave through a solid feed port 2 of the autoclave to obtain a mixture, the autoclave was sealed, and the mixture was stirred at 240° C. for 1 h.
d. The mixture was cooled to 100° C. under stirring, and 20 kg of Freon 12 (a mass of the Freon 12 was 8% of a mass of the waste polystyrene) was added into the autoclave through a liquid feed port 2 of the autoclave, and stirred at a constant temperature for 2 h to obtain a mixed material, during which, 7.5 kg of hydroxy calcium phosphate (a mass of the hydroxy calcium phosphate was 3%0 of a mass of water) was added into the autoclave in two batches through a solid feed port 2 of the autoclave, and the feed ports of the autoclave were immediately sealed.
e. A cooling device of the autoclave was started under stirring the mixed material, and the mixed material was cooled down to ambient temperature.
f. The cooled mixed material was transferred into a centrifuge through a discharge port of the autoclave and separated.
g. The separated mixed material with a certain humidity was dried, cooled, sieved and packaged, obtaining white, semi-translucent, B2-grade, and flame-retardant recycled expandable polystyrene spherical particles with a particle size of 1.2 mm to 1.5 mm.

The white, semi-translucent, B2-grade, and flame-retardant recycled expandable polystyrene spherical particles were foamed and molded into plates, and qualified according to the standards of GB/T 10801.1-2021 and GB8624-2012, and the specific data is shown in Table 3.

TABLE 3

Test results of performance of the recycled expandable polystyrene spherical particles obtained in Example 4

| Number | Test items | Unit | Standard requirement | Test results | Qualified or not | Test standard |
|---|---|---|---|---|---|---|
| 1 | Appearance | — | — | — | — | — |
| 1.1 | color | — | Uniform, B1-grade and B2-grade monochrome plates shall be mixed with particles of other colors for distinction | Uniform, with particles of other colors visible for distinction | Yes | GB/T 10801.1-2021 |
| 1.2 | External form | — | Smooth surface, without obvious shrinkage deformation and expansion deformation | Smooth surface, without obvious shrinkage deformation and expansion deformation | Yes | |
| 1.3 | Fusion | — | Good fusion | Good fusion | Yes | |
| 1.4 | Impurity | — | No obvious oil stain and impurity | No obvious oil stain and impurity | Yes | |
| 2 | Regular dimensions and tolerances | — | — | — | — | |
| 2.1 | Length | mm | ±5 | 2.0 | Yes | |
| 2.2 | Width | mm | ±5 | 2.0 | Yes | |
| 2.3 | Thickness | mm | ±4 | 0.5 | Yes | |
| 2.4 | Diagonal deviation | — | ≤5 | 1 | Yes | |
| 3 | Compressive strength | kPa | ≥100 | 106 | Yes | |
| 4 | Dimensional stability | — | — | — | — | |
| 4.1 | Length | % | ≤3 | 1 | Yes | |
| 4.2 | Width | % | ≤3 | 1 | Yes | |
| 4.3 | Thickness | % | ≤3 | 1 | Yes | |
| 5 | Fusion property | — | — | — | — | |

TABLE 3-continued

Test results of performance of the recycled expandable polystyrene spherical particles obtained in Example 4

| Number | Test items | Unit | Standard requirement | Test results | Qualified or not | Test standard |
|---|---|---|---|---|---|---|
| 5.1 | Bending load at break | N | ≥25 | 28 | Yes | |
| 6 | Apparent density deviation | % | ±5 | 1 | Yes | |
| 7 | Thermal conductivity (at an average temperature of 25° C.) | W/(m · k) | ≤0.037 | 0.036 | Yes | |
| 8 | Combustion performance of flat building materials and products | — | — | — | — | — |
| 8.1 | Flammability test | — | — | — | — | GB8624-2012 |
| 8.1.1 | Flammability test | mm | Flame tip height (Fs) ≤ 150 within 60 seconds | 110 | Yes | |
| 8.1.2 | Flammability test | — | Within 60 seconds, there is no burning dripping to ignite a filter paper | Within 60 seconds, there was no burning dripping to ignite a filter paper | Yes | |
| 8.2 | Single combustion test | — | — | — | — | |
| 8.2.1 | Single combustion test | W/s | Burning growth rate index $FIGRA_{0.2\ MJ}$ ≤ 120 | 111 | Yes | |
| 8.2.2 | Single combustion test | — | The lateral spread of flame does not reach an edge of a long wing of the sample | The lateral spread of flame did not reach an edge of a long wing of the sample | Yes | |
| 8.2.3 | Single combustion test | MJ | Total heat release at 600 second $THR_{600}$ ≤ 7.5 | 5.4 | Yes | |
| 8.3 | Combustion classification | — | Shall reach level $B_2$ | Level $B_2$ | Yes | |
| 9 | Oxygen index of plastic foam for wall insulation | — | — | — | — | |
| 9.1 | $B_1$-grade oxygen index | % | ≥26 | 30 | Yes | |

Example 5 a. 2,000 kg of waste polystyrene particles were added into a 5,000 L autoclave through a solid feed port 1 of the autoclave, and the autoclave was sealed.

b. 2,000 kg of water was added into the autoclave through a liquid feed port 1 of the autoclave, wherein a mass ratio of the waste polystyrene to water (oil-water ratio) was 1:1, and the autoclave was sealed. The waste polystyrene particles were completely dissolved by continuous stirring at 90 rpm and 220° C. in the autoclave to obtain a polystyrene solution, wherein the temperature inside the autoclave was achieved by heating at a heating rate of 0.9° C./min.

c. 100 kg of SDBS (a mass of SDBS was 5% of a mass of water) was added into the autoclave through a solid feed port 2 of the autoclave to obtain a mixture, the autoclave was sealed, and the mixture was stirred at a constant temperature of 220° C. for 0.5 h to obtain a first mixed material.

d. A cooling device of the autoclave was started under stirring the first mixed material, and the first mixed material was cooled down to ambient temperature.

e. The first mixed material was transferred into a centrifuge through a discharge port of the autoclave and separated to obtain separated solid particles, which were white and semi-translucent spherical intermediate particles with a particle size of 1.0 mm to 1.5 mm.

f. 2,000 kg of the white and semi-translucent spherical intermediate particles were added into the autoclave, 2,000 kg of an SDBS aqueous solution with a mass concentration of 4% was added into the autoclave, stirred at 90 rpm and heated to 90° C. at a heating rate of 0.5° C./min. 200 kg of pentane (a mass of pentane was 10% of a mass of the white and semi-translucent spherical intermediate particles) was added into the autoclave through a liquid feed port of the autoclave, and stirred at a constant temperature for 4 h to obtain a second mixed material, during which, 10 kg of hydroxy calcium phosphate (a mass of hydroxy calcium phosphate was 5%0 of a mass of the SDBS aqueous solution) was added into the autoclave in two batches through a solid feed port 2 of the autoclave, and the feed ports of the autoclave were immediately sealed.

g. A cooling device of the autoclave was started under stirring the second mixed material, the second mixed material was cooled to ambient temperature, and subjected to solid-liquid separation to obtain a separated mixed material with a certain humidity. The separated mixed material was dried, cooled, sieved and packaged, obtaining expandable recycled polystyrene spherical particles.

The expandable recycled polystyrene spherical particles were foamed and molded into plates and tested. The specific data is shown in Table 4.

TABLE 4

Test results of performance the expandable recycled polystyrene spherical particles obtained in Example 5

| Number | Test items | Unit | Standard requirement | Test results | Qualified or not | Test standard |
|---|---|---|---|---|---|---|
| 1 | Appearance | — | Color: uniform, the flame retardant type shall be mixed with colored particles to show the difference; external form: smooth surface, no obvious shrinkage deformation and expansion deformation; fusion: good fusion; impurities: no obvious oil stains and impurities. | The color was uniform, the surface was smooth, the fusion was good, and there was no obvious oil stain and impurity. | Yes | — |
| 2 | Dimension deviation | — | — | — | — | — |
| 2.1 | Length | mm | ±5 | −1 | Yes | GB/T 8811-2008 |
| 2.2 | Width | mm | ±5 | −1 | Yes | |
| 2.3 | Thickness | mm | ±3 | −2 | Yes | |
| 3 | Apparent density | $kg/m^3$ | ≥15.0 | 18.7 | Yes | GB/T 6343-2009 |
| 4 | Compressive strength | kPa | ≥60 | 117 | Yes | GB/T 8813-2020 |
| 5 | Thermal conductivity | W/(m · k) | ≤0.041 | 0.036 | Yes | GB/T 10294-2008 |
| 6 | Dimensional stability | — | — | — | — | — |
| 6.1 | Length | % | ≤4 | 0.4 | Yes | GB/T 8811-2008 |
| 6.2 | Width | % | ≤4 | 0.4 | Yes | |
| 6.3 | Thickness | % | ≤4 | 0.8 | Yes | |
| 7 | Bending load at break | N | ≥15 | 17 | Yes | GB/T 8812.1-2007 |

Example 6 a. 50 kg of a pretreated waste polystyrene foam was added into a 5,000 L autoclave through a solid feed port 1 of the autoclave, and the autoclave was sealed.

b. 2,000 kg of water was added into the autoclave through a liquid feed port 1 of the autoclave, and the autoclave was sealed. The waste polystyrene foam was completely dissolved by continuous stirring at 100 rpm and 200° C. in the autoclave to obtain a high-temperature dissolution solution, wherein the temperature inside the autoclave was achieved by heating at a heating rate of 0.7° C./min. The high-temperature dissolution solution at 200° C. was added into another 5,000 L autoclave filled with 50 kg of the pretreated waste polystyrene foam, and continuous stirred at 100 rpm and a constant temperature of 200° C. in the autoclave for 30 min. The above dissolving operation was repeated until 1,000 kg of the pretreated waste polystyrene foam was completely dissolved in water to obtain a polystyrene solution, wherein a mass ratio of the waste polystyrene foam to water (oil-water ratio) was 1:2.

c. 80 kg of SDBS (a mass of SDBS was 4% of a mass of water), 8 kg of MOBE (a mass of MOBE was 8%0 of a mass of waste polystyrene), and 50 kg of a graphite powder (a mass of the graphite powder was 5% of a mass of the waste polystyrene) were added into the autoclave through a solid feed port 2 of the autoclave to obtain a mixture, and the autoclave was sealed, and the mixture was stirred at 200° C. for 1 h to obtain a first mixed material.

d. A cooling device of the autoclave was started under stirring, and the first mixed material was cooled down to ambient temperature.

e. The cooled first mixed material was transferred into a centrifuge through a discharge port of the autoclave and separated to obtain separated solid particles, which were black polystyrene spherical intermediate particles with a particle size of 0.8 mm to 1.8 mm.

f. 1,000 kg of the black polystyrene spherical intermediate particles were added into the autoclave, 2,000 kg of an SDBS aqueous solution with a mass concentration of 5% was added into the autoclave, stirred at 100 rpm and heated to 85° C. at a heating rate of 1° C./min. 90 kg of petroleum ether (a mass of petroleum ether was 9% of a mass of the black polystyrene spherical intermediate particles) was added into the autoclave through a liquid feed port of the autoclave, and stirred at a constant temperature for 6 h to obtain a second mixed material, during which, 8 kg of hydroxy calcium phosphate (a mass of hydroxy calcium phosphate was 4%0 of a mass of the SDBS aqueous solution) was added into the autoclave in two batches through a solid feed port 2 of the autoclave, and the feed ports of the autoclave were immediately sealed.

g. A cooling device of the autoclave was started under stirring the second mixed material, the second mixed material was cooled to ambient temperature, and subjected to solid-liquid separation to obtain a separated mixed material with a certain humidity. The separated mixed material was dried, cooled, sieved and packaged, obtaining black, B1-grade, and flame-retardant expandable recycled graphite-polystyrene spherical particles with a particle size of 0.8 mm to 1.8 mm.

The black, B1-grade, and flame-retardant expandable recycled graphite-polystyrene spherical particles were foamed and molded into plates, and then qualified according to the standards of DB22/T 5011-2018 and GB/T 8624-2012, and the specific data is shown in Table 5.

TABLE 5

Test results of performance of the expandable recycled graphite-polystyrene spherical particles obtained in Example 6

| Number | Test items | | | Unit of measurement | Standard requirement | Test results | Qualified or not | Test standard |
|---|---|---|---|---|---|---|---|---|
| 1 | Apparent density | | | kg/m$^3$ | 18-22 | 20.6 | Yes | GB/T 6343-2009 |
| 2 | Thermal conductivity | | | W/(m · k) | ≤0.033 | 0.030 | Yes | GB/T 10294-2008 |
| 3 | Compressive strength | | | kPa | ≥90 | 117 | Yes | GB/T 8813-2008 |
| 4 | Perpendicular tensile strength | | | MPa | ≥0.10 | 0.15 | Yes | GB/T 29906-2013 |
| 5 | Combustion performance | Oxygen index | | % | ≥32 | 32.4 | Yes | GB/T 2406.2-2009 |
| | | Combustion level $B_1$ | Single combustion test | W/s | Burning growth rate index $FIGRA_{0.2\ MJ}$ ≤ 120 | 72.8 | Yes | GB/T 20284-2006 |
| | | | | / | The lateral spread of flame does not reach an edge of a long wing of the sample | The lateral spread of flame did not reach an edge of a long wing of the sample | Yes | |
| | | | | MJ | Total heat release at 600 seconds $THR_{600\ s}$ ≤ 7.5 | 4.3 | Yes | |
| | | | Flammability test | mm | Flame tip height ≤ 150 within 60 seconds | Flame tip height (Fs) < 150 within 60 seconds | Yes | GB/T 8626-2007, ignition time 30 seconds |
| | | | | / | Within 60 second, there is no burning dripping to ignite a filter paper | Within 60 seconds, there was no burning dripping to ignite a filter paper | Yes | |
| 6 | water absorption | | | % | ≤3 | 1.4 | Yes | GB/T 8810-2005 |
| 7 | Bending deformation | | | mm | ≥20 | 23 | Yes | GB/T 8812.1-2007 |
| 8 | Dimensional stability | | Length | % | ≤0.3 | 0.20 | Yes | GB/T 8811-2008 |
| | | | width | | | 0.20 | Yes | |
| | | | Thickness | | | 0.13 | Yes | |

Example 7 a. 50 kg of a pretreated waste polystyrene foam was added into a 5,000 L autoclave through a solid feed port 1 of the autoclave, and the autoclave was sealed.

b. 2500 kg of water was added into the autoclave through a liquid feed port 1 of the autoclave, and the autoclave was sealed. The waste polystyrene foam was completely dissolved by continuous stirring at 70 rpm and 240° C. in the autoclave to obtain a high-temperature dissolution solution, wherein the temperature inside the autoclave was achieved by heating at a heating rate of 0.6° C./min. The high-temperature dissolution solution at 240° C. was added into another 5,000 L autoclave filled with 50 kg of the pretreated waste polystyrene foam, continuous stirred at 70 rpm and a constant temperature of 240° C. in the autoclave for 30 min. The above dissolving operation was repeated until 250 kg of the pretreated waste polystyrene foam was completely dissolved in water to obtain a polystyrene solution, wherein a mass ratio of the waste polystyrene foam to water (oil-water ratio) was 1:10.

c. 75 kg of AES (a mass of AES was 3% of a mass of water) and 1.25 kg of HBCD (a mass of HBCD was 5%0 of a mass of waste polystyrene) were added into the autoclave through a solid feed port 2 of the autoclave to obtain a mixture, the autoclave was sealed, and the mixture was stirred at a constant temperature of 240° C. for 1 h to obtain a first mixed material.

d. A cooling device of the autoclave was started under stirring the first mixed material, and the first mixed material was cooled down to ambient temperature.

e. The cooled first mixed material was transferred into a centrifuge through a discharge port of the autoclave and separated to obtain separated solid particles, which were white and semi-translucent polystyrene spherical intermediate particles with a particle size of 1.2 mm to 1.5 mm.

f. 250 kg of the white and semi-translucent polystyrene spherical intermediate particles were added into the autoclave, 2,500 kg of an AES aqueous solution with a mass concentration of 6% was added into the autoclave, stirred at 70 rpm and heated to 100° C. at a heating rate of 0.8° C./min. 20 kg of Freon 12 (a mass of Freon 12 was 8% of a mass of the white and semi-translucent polystyrene spherical intermediate particles) was added into the autoclave through a liquid feed port of the autoclave, and stirred at a constant temperature for 5 h to obtain a second mixed material, during which, 7.5 kg of hydroxy calcium phosphate (a mass of hydroxy calcium phosphate was 3%0 of a mass of the AES aqueous solution) was added into the autoclave in two batches through a solid feed port 2 of the autoclave, and the feed ports of the autoclave were immediately sealed.

g. A cooling device of the autoclave was started under stirring the second mixed material, the second mixed material was cooled to ambient temperature, and subjected to solid-liquid separation to obtain a separated mixed material with a certain humidity. The separated mixed material was dried, cooled, sieved and packaged, obtaining white, semi-translucent, B2-grade, and flame-retardant expandable recycled polystyrene spherical particles with a particle size of 1.2 mm to 1.5 mm.

The expandable recycled polystyrene spherical particles were foamed and molded into plates, and qualified according to the standards of GB/T 10801.1-2021 and GB8624-2012, and the specific data is shown in Table 6.

TABLE 6

Test results of performance of the expandable recycled polystyrene spherical particles obtained in Example 7

| Number | Test items | Unit | Standard requirement | Test results | Qualified or not | Test standard |
|---|---|---|---|---|---|---|
| 1 | Appearance | — | — | — | — | — |
| 1.1 | Color | — | Uniform, B1-grade and B2-grade monochrome plates shall be mixed with particles of other colors for distinction | Uniform, with particles of other colors visible for distinction | Yes | GB/T 10801.1-2021 |
| 1.2 | External form | — | Smooth surface, without obvious shrinkage deformation and expansion deformation | Smooth surface, without obvious shrinkage deformation and expansion deformation | Yes | |
| 1.3 | Fusion | — | Good fusion | Good fusion | Yes | |
| 1.4 | Impurity | — | No obvious oil stain and impurity | No obvious oil stain and impurity | Yes | |
| 2 | Regular dimensions and allowable deviation | — | — | — | — | |
| 2.1 | Length | mm | ±5 | 2.0 | Yes | |
| 2.2 | Width | mm | ±5 | 2.0 | Yes | |
| 2.3 | Thickness | mm | ±4 | 0.5 | Yes | |
| 2.4 | Diagonal deviation | — | ≤5 | 1 | Yes | |
| 3 | Compressive strength | kPa | ≥100 | 106 | Yes | |
| 4 | Dimensional stability | — | — | — | — | |
| 4.1 | Length | % | ≤3 | 1 | Yes | |
| 4.2 | Width | % | ≤3 | 1 | Yes | |
| 4.3 | Thickness | % | ≤3 | 1 | Yes | |
| 5 | Fusion property | — | — | — | — | |
| 5.1 | Bending load at break | N | ≥25 | 28 | Yes | |
| 6 | Apparent density deviation | % | ±5 | 1 | Yes | |
| 7 | Thermal conductivity (at an average temperature of 25° C.) | W/(m · k) | ≤0.037 | 0.036 | Yes | |
| 8 | Combustion performance of flat building materials and products | — | — | — | — | — |
| 8.1 | Flammability test | — | — | — | — | — |
| 8.1.1 | Flammability test | mm | Flame tip height (Fs) ≤ 150 within 60 seconds | 110 | Yes | GB8624-2012 |
| 8.1.2 | Flammability test | — | Within 60 seconds, there is no burning dripping to ignite a filter paper | Within 60 seconds, there was no burning dripping to ignite a filter paper | Yes | |
| 8.2 | Single combustion test | — | — | — | — | |
| 8.2.1 | Single combustion test | W/s | Burning growth rate index $FIGRA_{0.2\ MJ} \leq 120$ | 111 | Yes | |
| 8.2.2 | Single combustion test | — | The lateral spread of flame does not reach an edge of a long wing of the sample | The lateral spread of flame did not reach an edge of a long wing of the sample | Yes | |
| 8.2.3 | Single combustion test | MJ | Total heat release at 600 seconds $THR_{600} \leq 7.5$ | 5.4 | Yes | |
| 8.3 | Combustion classification | — | Shall reach level $B_2$ | Level $B_2$ | Yes | |
| 9 | Oxygen index of plastic foam for wall insulation | — | — | — | — | GB8624-2012 |
| 9.1 | $B_1$-grade oxygen index | % | ≥26 | 30 | Yes | |

The above descriptions are merely preferred embodiments of the present disclosure. It should be noted that a person of ordinary skill in the art may further make several improvements and modifications without departing from the principle of the present disclosure, but such improvements and modifications shall be deemed as falling within the protection scope of the present disclosure.

What is claimed is:

1. A recycling method of waste polystyrene, comprising the following steps:

subjecting the waste polystyrene and water to a first swelling and dissolving to obtain a polystyrene solution;

subjecting the polystyrene solution and a first surfactant to a first mixing to obtain a first mixed material; and subjecting the first mixed material to a first cooling and a first centrifugation in sequence to obtain a recycled polystyrene; wherein a mass ratio of the waste polystyrene to the water is less than or equal to 1:1; and the first swelling and dissolving is conducted at a temperature of 140° C. to 240° C.

2. The recycling method of claim 1, wherein the first mixing is conducted at a temperature of 140° C. to 300° C.

3. The recycling method of claim 1, wherein the first surfactant comprises one or more selected from the group consisting of polyvinylpyrrolidone (PVP), sodium fatty alcohol polyoxyethylene ether sulfate (AES), a stearate, sodium palmitate, an oleate, an alkyl cellulose, cetyltrimethylammonium bromide (CTAB), gelatin, sodium dodecyl benzene sulfonate (SDBS), sodium dodecyl sulfate (SDS), sodium polyacrylate, and a disproportionated rosinate;

the stearate comprises potassium stearate and/or sodium stearate;

the oleate comprises potassium oleate and/or sodium oleate;

the alkyl cellulose comprises one or more selected from the group consisting of hydroxypropyl cellulose (HPC), methylcellulose (MC), methyl hydroxyethyl cellulose (MHEC), and hydroxyethyl cellulose (HEC); and the disproportionated rosinate comprises disproportionated potassium rosinate and/or disproportionated sodium rosinate.

4. The recycling method of claim 1, wherein a mass of the first surfactant is 1% to 8% of a mass of the water.

5. The recycling method of claim 1, wherein the first mixed material further comprises a first functional auxiliary agent and/or a first foaming system, wherein the first functional auxiliary agent comprises a first flame retardant and/or a first heat insulating agent;

the first flame retardant comprises hexabromocyclododecane (HBCD) and/or methyl octabromoether (MOBE);

the first heat insulating agent comprises graphite and/or graphene;

the first foaming system comprises a first foaming agent and a first inorganic dispersant;

the first foaming agent is a physical foaming agent comprising one or more selected from the group consisting of an alkane, petroleum ether, carbon dioxide, and Freon;

the alkane comprises one or more selected from the group consisting of propane, butane, pentane, hexane, and heptane;

the Freon comprises Freon 11 and/or Freon 12; and the first inorganic dispersant comprises one or more selected from the group consisting of calcium phosphate, hydroxy calcium phosphate, calcium carbonate, calcium oxalate, barium sulfate, calcium sulfate, zinc oxide, magnesium hydroxide, aluminum hydroxide, bentonite, kaolin, titanium dioxide, graphite, and mica.

6. The recycling method of claim 5, wherein masses of the first flame retardant and the first heat insulating agent each are independently 0.1% to 8% of a mass of the waste polystyrene.

7. The recycling method of claim 5, wherein a mass of the first foaming agent is 6% to 10% of a mass of the waste polystyrene; and a mass of the first inorganic dispersant is 0.1% to 9% of a mass of the water.

8. The recycling method of claim 1, further comprising the following steps after the first centrifugation: subjecting intermediate particles obtained after the first centrifugation, a second surfactant aqueous solution, and a second foaming system to second mixing to obtain a second mixed material, and subjecting the second mixed material to second swelling and dissolving, second cooling, and second centrifugation in sequence.

9. The recycling method of claim 8, wherein the first mixed material further comprises a second functional auxiliary agent;

the second functional auxiliary agent comprises a second flame retardant and/or a second heat insulating agent; wherein the second flame retardant comprises HBCD and/or MOBE;

the second heat insulating agent comprises graphite and/or graphene;

masses of the second flame retardant and the second heat insulating agent each are independently 0.1% to 8% of a mass of the waste polystyrene.

10. The recycling method of claim 8, wherein the second surfactant aqueous solution has a mass concentration of 4% to 8%;

a mass ratio of the intermediate particles to the second surfactant aqueous solution is less than or equal to 1:1;

the second foaming system comprises a second foaming agent or a foaming agent-inorganic dispersant;

a mass of the second foaming agent is 6% to 10% of a mass of the intermediate particles; and a mass of a second inorganic dispersant contained in the foaming agent-inorganic dispersant is 0.1% to 9% of a mass of the second surfactant aqueous solution.

11. The recycling method of claim 3, wherein a mass of the first surfactant is 1% to 8% of a mass of the water.

* * * * *